United States Patent
Moilala

(10) Patent No.: US 7,059,385 B2
(45) Date of Patent: Jun. 13, 2006

(54) AIR CONDITIONING DEVICE

(75) Inventor: Kari Moilala, Kajaani (FI)

(73) Assignee: MG Innovations Corp., Kajaani (FI)

( * ) Notice: Subject to any disclaimer, the term of this patent is extended or adjusted under 35 U.S.C. 154(b) by 0 days.

(21) Appl. No.: 10/258,035

(22) PCT Filed: Apr. 17, 2001

(86) PCT No.: PCT/FI01/00377

§ 371 (c)(1),
(2), (4) Date: Oct. 18, 2002

(87) PCT Pub. No.: WO01/81837

PCT Pub. Date: Nov. 1, 2001

(65) Prior Publication Data

US 2003/0102106 A1     Jun. 5, 2003

(51) Int. Cl.
*F28F 27/02*     (2006.01)
*F28D 17/00*     (2006.01)

(52) U.S. Cl. .................. 165/4; 165/66; 165/97

(58) Field of Classification Search .......... 165/66, 165/54, 52, 4, 119, 96, 97, 909, 10, DIG. 92; 137/309, 310, 311; 431/215; 96/139, 124
See application file for complete search history.

(56) References Cited

U.S. PATENT DOCUMENTS

| | | | |
|---|---|---|---|
| 4,446,911 A | | 5/1984 | Reidick et al. |
| 4,497,361 A | * | 2/1985 | Hajicek ........................ 165/10 |
| 4,558,731 A | * | 12/1985 | Pentikainen et al. ........... 165/4 |
| 4,799,539 A | * | 1/1989 | Atkin et al. .................... 165/54 |
| 5,050,667 A | * | 9/1991 | Berner et al. .................... 165/4 |
| 5,183,098 A | * | 2/1993 | Chagnot ........................ 165/54 |
| 5,515,909 A | * | 5/1996 | Tanaka ............................ 165/4 |
| 5,848,885 A | * | 12/1998 | Tanaka et al. ................ 431/215 |
| 5,983,986 A | * | 11/1999 | Macintyre et al. ............. 165/54 |
| 6,039,109 A | * | 3/2000 | Chagnot ........................ 165/54 |

FOREIGN PATENT DOCUMENTS

| | | | |
|---|---|---|---|
| DE | 3938542 A | * | 5/1991 |
| DE | 19739600 | | 3/1999 |

(Continued)

OTHER PUBLICATIONS

Aittomaki, A.; Karkiainen, S.; and Vehmaan-Kreula, M.; Uimahallien Ilmankuivausjarjestelmien Vertailu (Comparison of air drying systems in public swimming baths) Tampereen TKK (Tampere University of Technology), Energy and Process Engineering, UDK 694.97,725.74, Report 131, Tampere 1997, ISBN 951-722-938-0, ISSN 1238-4747.

*Primary Examiner*—Tho Duong
(74) *Attorney, Agent, or Firm*—Alfred A. Fressola; Ware, Fressola, Van Der Sluys & Adolphson LLP

(57) ABSTRACT

The invention relates to an air condition device consisting of recovery cells (1, 2), an inlet (3) and exhaust ducts (4) leading to and from a room, an inlet (5) and exhaust ducts (6) located at the other end of the device and leading to and from the outdoor air, the air flows in the air conditioning device being controlled by means of rotating deflectors (7, 8). The deflectors (7, 8) consist of baffles fixed to different control axes (9, 10) and rotating about their axes, the air openings (11, 12) provided in the deflectors being located alternatingly at the same recovery cell (1, 2), where the air flow directions are reversed periodically.

5 Claims, 1 Drawing Sheet

FOREIGN PATENT DOCUMENTS

| | | |
|---|---|---|
| FI | 67446 | 11/1984 |
| FI | 100133 | 9/1997 |
| FI | 1001338 B * | 9/1997 |
| FI | 4123 | 9/1999 |

* cited by examiner

AIR CONDITIONING DEVICE

CROSS REFERENCE TO RELATED APPLICATIONS

This application is for entry into the U.S. national phase under §371 for International Application No. PCT/FI01/00377 having an international filing date of Apr. 17, 2001, and from which priority is claimed under all applicable sections of Title 35 of the United States Code including, but not limited to, Sections 120, 363 and 365(c), and which in turn claims priority under 35 USC §119 to Finnish Patent Application No. 20010759 filed on Apr. 11, 2001 and Finnish Patent Application No. 20000941 filed on Apr. 19, 2000.

TECHNICAL FIELD

This invention relates to an air conditioning device comprising recovery cells, inlet and exhaust ducts leading to and from a room, and inlet and exhaust ducts leading to and from the outdoor air and located at the other end of the device, the air flows in the air conditioning device being controlled by means of deflectors rotating about separate axes.

BACKGROUND OF THE INVENTION

In conjunction with air conditioning, the following issues must be considered: recovery of exhaust air energy, moisture balancing and cooling/heating. In addition, these matters have a different impact in terms of geography. In cold zones, heat recovery is vital, in the temperate zone cooling and moisture balancing are also primary issues, whereas the focus is on cooling and dehumidification of outdoor air in the hot zone.

It has been stated that cooling entails costs that are about six times those of heating. The cooling of outdoor air into indoor air requires much energy in the warm zone. Due to the high connection power required by cooling device compressors, operating such devices with the use on renewable forms of energy is not justified.

In the summer, the relative humidity of indoor premises tends to be too high, whereas it is too low in the heating season. This is due to the fact that hot air may contain more humidity. For the moisture balance to be ideal, expensive air dryers and humidifiers are needed.

Condensed humidity releases heat, and similarly, evaporated humidity binds heat. By making skilful benefit of these natural phenomena, the relative humidity of indoor air can be kept in balance and energy consumption reduced.

Air dehumidification is more difficult and expensive than mere cooling. As a solution to this, it has even been proposed to recirculate indoor air that has been dried once, however, this involves the problem of lack of fresh air. Humans, animals and buildings themselves are in need of fresh air. The reason for such solutions is the high energy consumption caused by conventional techniques.

Besides humidity problems, moisture condensation in heat recovery cells results in the cell array freezing at temperatures below zero without additional heating of the cells. In conventional plate heat exchangers on bakeries, humidity associated with flour and yeast dust will form a "dough" in the cells, so that air cannot pass through these. Then the heat from the ovens cannot be recovered, for instance.

Heated air may contain more humidity than cold air. Heated and moist air that has been conducted to a duct system may result in mildew damages, because mildew growth requires nothing but moisture and heat.

Impurities in indoor air cause serious sanitary and economic damage, let alone problems related to comfort. Humans, animals and plants all suffer from these problems. Outdoor air may be purer than indoor air, however, in cities and specifically in industrial environments the outdoor air is more polluted than the indoor air.

If the filters are not replaced according to instructions, the impurities will increase. If the location of a filter is sufficiently hot and humid, there will be bacterial growth on its surface, even of lethal legionella in the extreme.

Air contains particles differing in size/diameter from those that can be seen with the bare eye—a diameter above 5 micrometers, visible only with a special microscope a diameter p less than 0.1 micrometer. The greatest impurities consist of e.g. hair, pollen and coal dust. Smaller impurities are e.g. bacteria, dust which is hazardous for the lungs, sulphur compound fog, oil mist and lead monoxide. The smallest particles consist of viruses and fumes.

Air filters can be roughly divided into coarse filters, which clean impurities that can be seen with the bare eye, fine and electric filters, which clean also impurities visible only with a microscope, and finally hepa filters, which clean practically all impurities.

SUMMARY OF THE INVENTION

Various solutions have been developed for all these known purposes, and their methods are known per se. The present invention allows the problems mentioned above to be solved with one single device. The invention enables values to be combined and maximized, which are a function of the following: 1. The accumulated mass. 2. The area transferring heat, cold and humidity. 3. The air flow rate and the time required to achieve the condensation point.

Everyone skilled in the art knows the effect of these variables. Vital aspects of this invention are also its straightforward solution, low production costs and the low energy consumption required by the device. The air conditioning device of the invention is characterised by the fact that both the deflectors consist of rotating baffles provided with air inlets known per se and either separately or together controlled. During the periodical rotation of the deflectors, the direction of the air flows is reversed. The air flows to and from the air conditioning device have been provided by means of fans known per se, with the air openings in the deflectors mutually aligned.

In the winter, the operation of a heat recovery cell operating in the regenerative counter flow principle is the following: as hot and cold indoor air passes through the cell, the impurities are directed out from the cell as the heat is transferred from the air into the cell, and then the humidity is condensed, forming a mist film on the cell surface.

FI patent specification 100,133 discloses recovery cells and deflectors similar to those of the invention, however, with the difference that the air ducts directed to the indoor and outdoor air are always located on the same side of the recovery cells (the device has a hot and a cold end) and that the air openings are always located at the same cell, whereas in accordance with the patent, ducts leading both to the outdoor and to the indoor air are located at the same end and the air openings are always located at different cells. In accordance with the patent, a deflector controls air flows flowing in the same direction, whereas in the invention, the provision described above reverses the air flow directions using the counterflow principle. The present invention yields the following advantages, among other things (i.e., on the basis of the following tests: VTT/4 October 1995; RTE 10406/95 and SINTEF/8 November 1892/STF15F 82029, 28 May 1982/150164): 1) very high temperature efficiency (VTT: 87.8%, SINTEF: 98%. 2) In hot (above 30° C.) and humid (relative humidity above 80%) outdoor conditions the device cools indoor air even by 3–5° C. without supplementary energy. 3) Properly used, the cell array will not freeze. 4) Low connection power. 5) Balancing of the relative humidity of indoor air by 38–67%. The device described in FI patent specification 100,133 does not provide such functions nor such high efficiency, because it operates on the forward current principle.

The effect of the device of the present invention on temperatures and humidity are presented below. In the summer, with an indoor temperature of 23° C., the air contains 7 $g/m^3$ of water, implying 41% relative humidity.

When a cell having a temperature of 23° C. is heating to 30° C., water is discharged along with the air flow at a maximum rate of 6 $g/m^3$. If the cell cools to 23° C., water will enter (26 g–17 g) in an amount of 9 g, because when saturated, air having a temperature of 23° C. contains 17 g of water.

When the outdoor air is warm and humid, the relative humidity of indoor air also tends to rise because of losses. In this case as well, the invention will maintain the relative humidity of indoor air at about 45%.

In the winter, the invention has the following function: air at −10° C. contains 2 $g/m^3$ of water. Indoor air is heated to 20° C., binding 14 g of humidity. The amount of discharged water (air at 20° C.) is 7 $g/m^3$. When the air is cooled to −10° C., it can remove only 2 g of water. The difference (7−2) 5 g+2 g. and thus the device can bring back 7 g of water inside. However, due to losses (10%) the relative indoor humidity drops to about 30% in reality in the winter.

Should the conventional indoor air cooling be inadequate, separate evaporating cooling can be used as follows. By saturating exhaust air (+20° C.=16 $g/m^3$ of water) an effective cooling device is obtained for outdoor air at +30° C. (25 $g/m^3$ of water). When outdoor air leaves the room through the cell, its humidity rises from 16 g to 25 g=a difference of 9 $g/m^3$, i.e. about 30% of 25 g. As it evaporates into the outdoor air, water cools the cells (binding heat) at the same rate (25–16=9, i.e. about 30%), in other words, the evaporation of humidity from the cell cools the cell and the air (30% of 20° C.)=about 6° C. Theoretically, with a 10% loss, thus about 5° C. which corresponds also to the 3–5° C.; of the tests conducted in the practice (SINTEF/2 Jul. 1982).

The work Aittomäki, A., Karkiainen. S., Vehmaan-Kreula. K., Uimahallien ilmankuivausjärjestelmien vertailu, (Comparison of air drying systems in public swimming baths), Tampereen TKK (Tampere University of Technology), Energy and Process Engineering, UDK 694.97,725.74, Report 131, Tampere 1997, ISBN 951-722-938-0, ISSN 1238-4747, states the following on page 36:

The following conclusions can be drawn from the results:
the larger the heat recovery area, the less the heat pump decreases heat consumption.
an increase in the heat recovery area reduces heat consumption more than an increase in the evaporator area.
the target humidity of the bath hail has a strong impact on the heat consumption. By contrast, limiting temperature (−10° C. or 0° C. of the amount of outdoor air has no notable impact.
a heat pump may cut the energy costs, however, the difference is too small for investment amortisation.

The apparatus of the invention comprises regenerative heat recovery combined with a drying function on the absorption principle (area increase). As described above, the invention may be further connected with a heat pump system, and then any remaining humidity will be removed from the evaporator. One single apparatus may hence include all the main functions required for air drying.

The cells of the apparatus of the invention are alternatingly hot and cool, so that the air humidity is alternatingly condensed and evaporated in the set of cells. Owing to this vital property, the device operates faultlessly also in bakeries.

The access of pollen and any other impurities can be prevented by mounting a filter at the outdoor air end of the recovery cell, so that impurities adhere to the filter and return to the inlet side when the air flow direction is reversed, without contaminating the indoor air or the heat recovery cell. A major advantage of the invention is that the air filter does not require cleaning, and thus its cleaning efficiency will remain the same as that of a new device, and no bacterial growth will occur. By varying the type of filter the cleaning efficiency is varied. In hospitals for instance, hepa filters can be used, whereas lower filtering capacity is enough for other purposes of use. The filter should be selected such that impurities in indoor air pass through, whereas impurities in outdoor air are caught in it.

In a regenerative heat recovery device controlled with baffles, the cells might freeze. This is due to the fact that the baffles generate underpressure and overpressure, so that the humidity contained in the air might be condensed to water on the cell surfaces. The additional heating then required results in poorer energy management and higher production costs, and thus in a longer period of earning (recouping) the price of the device.

In accordance with the invention, the deflectors can be controlled by means of different shafts. In one embodiment of the invention, the deflector on the exhaust air side of the cell array can be controlled to turn with a delay, further minimizing mixing of the air flows in the cell. An advantage of the invention over large units is that the long shaft of such units tends to be twisted, and then the turning of the deflectors is beyond control. On the other hand, the invention also makes it possible for the deflectors to be controlled to rotate by the same axis, accordingly FI patent 100,133.

In the warm zone, the heat recovery cell excludes the heat. Should the air deriving from the air recovery cell still be too hot, it can be directed from the cooling unit condenser further to an evaporator, from where it is conducted as cooled air to the indoor premises. A conventional cooling system cools outdoor air (from e.g. 40° C.) to indoor air (20° C.) by means of a compressor. The amount of energy required is about 1.5 kW. Since, in accordance with the invention, 90% of the difference between outdoor and indoor temperatures is kept outside, the compressor needs to cool only 10% (2° C. in the example). The required connection power is only 200 W. The cooling system comprises a compressor, a heat transfer medium including piping and other appliances, and a condenser and an evaporator, which are known per se.

The invention can also be used in connection with conventional cooling and air conditioning and heat recovery systems by directing the inlet ducts leading to the outdoor air first to the device of the invention, and then the air is directed to a cooling or air conditioning unit. With this arrangement, conventional devices will yield the benefits of the invention.

In conventional air conditioning, the periods for heat recovery devices and cooling devices to earn their price get very long. Besides the price, there is the question of additional energy required for melting regarding the heat recovery devices. On the one hand, cooling devices operating with an outdoor air heat pump are unable to function at temperatures below zero. On the other hand, exhaust air heat pumps are of no use when the outdoor temperature is higher than the indoor air temperature. Thus, such devices will have a very short service period per year. Should both systems be needed, the price would be even higher. Calculated under the (winter) conditions in Finland and with the average electricity prices in Finland, the period over which the device of the invention will earn its price is about three years. Calculated in combination with a cooling device and under the hot (summer) conditions in the USA and with the average electricity prices in the USA, the device may have earned its price within less than a year. An extremely good Seasonal Performance Factor (SPF) results from the long utilization time per year, which is actually the whole year, because the device can act as a heat pump both in the winter and in the summer.

Finnish Utility Model No 4123 filed Jun. 24, 1999, registered Oct. 14, 1999, describes in general terms a regenerative counter-current air conditioning device, without explaining in detail the manner of reversing the air flow directions.

Various embodiments of the invention are described in the dependent claims.

BRIEF DESCRIPTION OF THE DRAWING

The invention is described below by means of an example and with reference to the accompanying drawing, which is a schematic view of the air conditioning device and air flows provided in the air conditioning device.

BEST MODE FOR CARRYING OUT THE INVENTION

Figure 1:
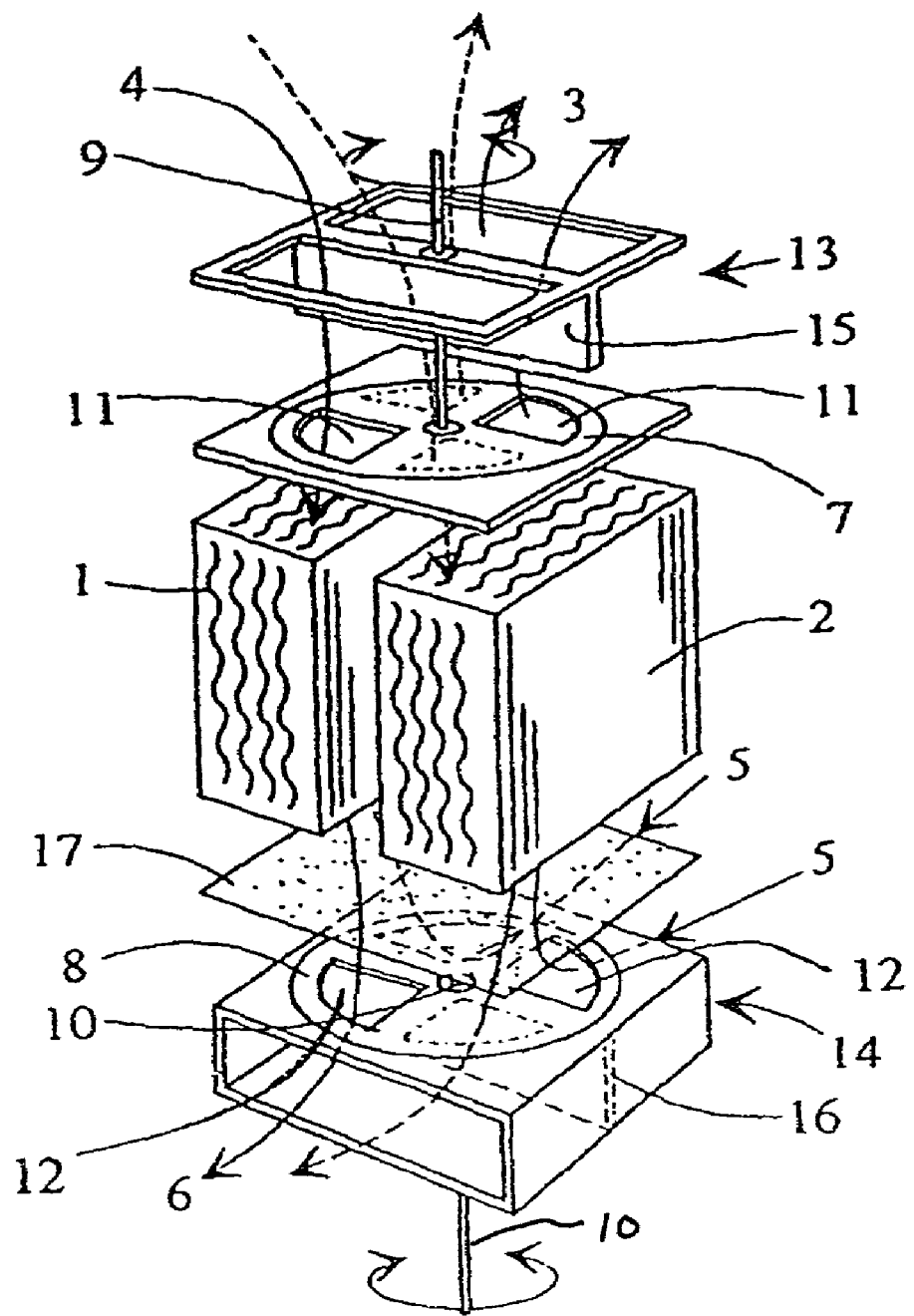

The air conditioning device consists of recovery cells 1, 2, inlet 3 and exhaust ducts 4 leading to and from a room, and inlet 5 and exhaust ducts 6 leading from and to the outdoor air. The air flows are controlled by means of rotating deflectors 7, 8. The deflectors 7, 8 consist of baffles fixed to either different control axes 9, 10 and rotating about their axis and provided with air openings 11, 12. The deflectors 7, 8 are located on axes/axis 9, 10 on either side of the recovery cells 1, 2. The deflectors 7, 8 have an even number of air openings 11, 12, through which the air flows are directed alternatingly to the recovery cells 1, 2, where the air flow directions are inverse and are periodically reversed. The air flows are indicated by means of arrows. The air openings 11, 12 in the deflectors 7, 8 form an approximate 90 degree angle. The top and bottom pressure balancing chambers 13, 14 have stationary partitions 15, 16. The deflector can be rotated periodically by means of a timer in the same direction or reciprocatingly, or even continuously by adjusting the rotating speed with the aid of a motor (not shown in the drawing). The recovery cells 1, 2 are long in the air flow direction, having a length 2–5 times their width. The recovery cells can be replaced according to the climate and the service conditions of the device, for instance by increasing the heat recovery or the evaporating function, i.e. the cooling, respectively. The bulk, area, turbulence of the cells 1, 2 and the air flow rate vary under these varying conditions. The heat recovery efficiency and the humidity balancing can be adjusted with a timer so that the alternating periods or rotation speeds of the deflectors can be altered. At the outdoor end of the ducts 5, 6 of the recovery cells 1, 2 an air filter 17 has been mounted, which prevents the access of impurities from the outdoor air, yet during the subsequent period lets through smaller impurities from the indoor air, the air flow also entraining outdoor impurities which have adhered to the filter.

The invention claimed is:

1. An air conditioning device comprising exactly two separate recovery cells (1, 2), an inlet duct (3) and an exhaust duct (4) leading to and from a room at a first end of the device, an inlet duct (5) and an exhaust duct (6) located at a second end of the device and leading from and to the outdoor air, the air flows in the air conditioning device being controlled by means of a first deflector (7) located at the first end of the device and a second deflector (8) located at the second end of the device, characterised in that the first deflector has first and second air openings (11) and the second deflector has first and second air openings (12), and further wherein the device has axes (9, 10) for controllably rotating the deflectors so that the first air openings of each deflector are aligned with each other and that the second air openings of each deflector are aligned with each other as the deflectors are periodically rotated a given angular displacement so that the direction of air flow in each recovery cell (1, 2) is alternately reversed and so that the air flow from the room to the outside and the air flow from the outside to the room each alternately use different cells (1, 2).

2. An air conditioning device as defined in claim 1, characterised in that the deflectors (7, 8) have an even number of air openings (11, 12).

3. An air conditioning device as defined in claim 1, characterised in that the deflectors (7, 8) are circular baffles wherein the first and second air openings (11, 12) of each deflector are in the shape of a sector.

4. An air conditioning device comprising:
  exactly first and second recovery cells (1, 2) spatially separated from each other, each having a first end and a second end;
  a room inlet duct (3) and a room exhaust duct (4) leading to and from a room at a first end of the device and in juxtaposed spaced relationship with the first end of the first and second recovery cells;
  an outside air inlet duct (5) and an outside air exhaust duct (6) leading from and to outdoor air at the second end of the device and in juxtaposed spaced relationship with the second end of the first and second recovery cells;
  a first rotating deflector (7) positioned at the first end of the device and having two air openings (11), wherein the two air openings are angularly separated from each other so that each air opening only communicates with one recovery cell at a given time and further wherein each air opening only communicates with the room inlet duct (3) or the room exhaust duct (4) at a given time;
  a second deflector (8) positioned at the second end of the device and having two air openings (12), wherein the two air openings are angularly separated from each other so that each air opening only communicates with one recovery cell at a given time and further wherein each air opening only communicates with the outside air inlet duct (5) or the outside air exhaust duct (6) at a given time; and
  wherein said first deflector and said second deflector are rotationally controlled by at least one axis (9, 10), and,
  wherein said at least one axis is periodically rotated by a given angular displacement so that a first air opening of the first deflector and a first air opening of the second deflector are aligned with each other on opposite ends of the first recovery cell while the second air opening of the first deflector and the second air opening of the second deflector are aligned with each other on opposite ends of the second recovery cell at the same time in a manner so that the first air openings of the first and second deflectors form an air flow path from the room to the outside air through the first recovery cell while the second air openings of the first and second deflectors form an air flow path from the outside air to the room through the second recovery cell and so that said air flow paths use the other recovery cell when the first and second deflectors are periodically rotated, whereby the direction of air flow in each recovery cell is alternately reversed.

5. An air conditioning device as defined in claim 4, wherein the first and second deflectors (7, 8) are circular baffles and wherein the first and second air openings (11, 12) of the first and second deflectors are in the shape of a sector.

* * * * *

UNITED STATES PATENT AND TRADEMARK OFFICE
CERTIFICATE OF CORRECTION

PATENT NO. : 7,059,385 B2
APPLICATION NO. : 10/258035
DATED : June 13, 2006
INVENTOR(S) : Moilala It is certified that error appears in the above-identified patent and that said Letters Patent is hereby corrected as shown below:

1. At column 2, line 15, please insert a hyphen -- - -- after the word "microscope".

2. At column 3, line 48, please insert --;-- after "C.".

3. At column 3, line 48, please delete --;-- after "C.".

4. At column 3, line 62, please delete "hail" and insert --hall-- therefor.

5. At column 3, line 64, please insert --)-- after "C".

6. At column 5, line 44, please insert --or same control axis 9,10-- after "9,10".

Signed and Sealed this

Twenty-third Day of January, 2007

JON W. DUDAS
*Director of the United States Patent and Trademark Office*